United States Patent Office 3,225,052
Patented Dec. 21, 1965

3,225,052
BENZIMIDAZOLINYL PIPERIDINE
DERIVATIVES
Raul Adriaan Jan Janssen, Vosselaar, near Turnhout, Belgium, assignor to Janssen Pharmaceutica N.V., a corporation of Belgium
No Drawing. Filed May 6, 1964, Ser. No. 365,509
6 Claims. (Cl. 260—293.4)

This invention relates to a new series of organic compounds. More particularly, it concerns certain benzimidazolinyl piperidine and the therapeutically active non-toxic acid addition salts thereof.

The novel compounds of this invention may be represented by the following formula:

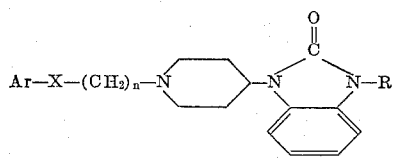

wherein R is selected from the group consisting of hydrogen, lower alkyl, lower alkyl-carbonyl, hydroxymethyl, halomethyl, lower alkoxymethyl, cyanomethyl, cyano-Z— and lower alkoxy-carbonyl-Z—, said —Z— being a —$CH(R_2)CH(R_2)$— radical wherein $R_2$ is a member selected from the group consisting of hydrogen and methyl; X is selected from the group consisting of oxygen and sulfur; and $n$ is an integer from 2 to 5, preferably 3.

In the above formula, Ar represents an aryl radical selected from the group consisting of phenyl; halophenyl, preferably chlorophenyl and fluorophenyl; lower alkylphenyl, preferably methylphenyl; di-lower alkylphenyl, preferably methyl-isopropylphenyl; and lower alkoxyphenyl, preferably methoxyphenyl.

As used herein, lower alkyl and lower alkoxy have from 1 to 5 carbon atoms, such as, for example, methyl, ethyl, propyl, isopropyl, butyl, isobutyl, tertiary-butyl, pentyl and the like, and the respective methoxy, ethoxy, propoxy, isopropoxy, butoxy, etc.

Depending upon the conditions employed during the course of the reaction, the novel compounds of this invention are obtained either in the form of the free bases or salts thereof. The salts are converted to the free bases in the usual manner, e.g., by reaction with alkali such as sodium or potassium hydroxide. The compounds in base form may be converted to their therapeutically useful acid addition salts by reaction with an appropriate acid as, for example, an inorganic acid such as a hydrohalic acid, i.e. hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicylic, p-aminosalicylic, 2-phenoxybenzoic or 2-acetoxybenzoic acid.

The compounds of this invention have useful pharmacological properties. They show activity as central nervous system depressants and are particularly useful as neuroleptic agents, as illustrated by inhibition of learned avoidance-escape behavior in treated rats and dogs, the inhibition of apomorphine induced vomiting in dogs and amphetamine-antagonizing properties in rats. Furthermore, these compounds are potent inhibitors of the licking-reflex in mice, without showing any mydriatic activity at the same dose level and also without any indication of a Straub phenomenon.

The compounds of this invention, particularly those wherein R is other than lower alkyl-carbonyl, may be obtained by reacting a compound of the formula, $$Ar—X—(CH_2)_n—Hal$$

wherein Hal stands for chloro or bromo, and each of X, Ar and $n$ is as previously defined, with the appropriate 4-(2-oxo-1-benzimidazolinyl)-piperidine in an inert organic solvent under, preferably, reflux conditions and in the presence of a halogen acid acceptor, for example, sodium carbonate and organic tertiary amines such as the trialkylamines, e.g., triethyl amine, tributyl amine, etc.; heterocyclic amines, e.g., N-alkyl piperidine, N-alkyl morpholine, pyridine, quinoline, etc.; and dialkyl aromatic amines, e.g., diethyl aniline, dimethyl aniline, etc., to bind the halogen acid that is liberated during the course of the reaction, the amount of which can easily be calcuated from the quantities of reactants employed and, thus the corresponding amount of halogen acid acceptor that need be employed can readily be determined. Among the organic solvents that are operable herein are aromatic hydrocarbons such as toluene, benzene, xylene and the like; lower aliphatic alcohols such as methanol, ethanol and the like; and aliphatic ketones such as acetone, butanone, 4-methyl-2-pentanone and the like.

Introduction of a hydroxymethyl group at the 3-position of the benzimidazolinone moiety is effected by treatment of the desired benzimidazolinone of this invention wherein R is hydrogen, i.e., the 3-position on the benzimidazolyl function is unsubstituted, with formaldehyde under reflux conditions in the presence of a suitable water-organic solvent, e.g., an aqueous solution of formaldehyde and methanol, ethanol, isopropanol, dioxane, benzene, toluene, etc.

The compounds of this invention, wherein R is lower alkyl-carbonyl, may be prepared by acylation of the corresponding benzimidazolinone, which is unsubstituted in the 3-position, i.e., where R is hydrogen. The reaction may be carried out by heating such unsubstituted benzimidazolinones, preferably under reflux conditions, with an appropriate acylating agent such as the anhydride of a lower aliphatic acid, e.g., acetic anhydride, propionic anhydride, n-butyric anhydride, isobutyric anhydride, valeric anhydride, caproic anhydride and the like. Lower carboxylic acid halogenides may also be used advantageously as the acylating agent, e.g., acetyl chloride, butyryl chloride, isobutyryl chloride, valeryl chloride and the like. The acylation reaction may be carried out in a variety of anhydrous non-hydroxylic solvents such as benzene, toluene, chloroform, methylene chloride, tetrahydrofuran, diethylether, etc.

Introduction of a lower alkyl group in the 3-position of the benzimidazolinyl moiety is accomplished by treatment of the corresponding 3-unsubstituted benzimidazolinone with the appropriate alkylating agent, such as a lower alkyl halide or, if a methyl group is desired, a phenyltrimethylammonium halide, such as the bromide, iodide or chloride, in the presence of a strong base, e.g., sodium amide, under reflux conditions in a suitable inert organic solvent such as the aromatic hydrocarbons, e.g., benzene, toluene, xylene and the like.

Replacement of the hydroxy function in the 3-(hydroxymethyl)-substituted benzimidazolinyl moiety with a halogen is suitably effected by treatment with a sulfur or phosphorous oxyhalide, as, for example, phosphorous-oxychloride, or preferably, thionyl chloride, at temperatures generally at or below room temperature to yield the corresponding 3-(halomethyl)-substituted benzimidazolinyl piperidines of this invention. Furthermore, treatment of the resulting halogenated derivative with the appropriate alkali earth metal or alkali metal salt of a lower alkanol in the presence of a solvent suitable for such alkoxide, e.g., a lower alkanol, under reflux conditions, causes formation of the appropriate ether function, i.e., a lower alkoxymethyl group then resides in the 3-position of the benzimidazolinyl moiety.

Cyano-Z— groups, wherein —Z— represents a —CH($R_2$)CH($R_2$)— radical in which each $R_2$ stands for hydrogen or methyl, may be introduced into the 3-position of the benzimidazolinone moiety by treating the corresponding 3-unsubstituted benzimidazolinone with the appropriate α,β-unsaturated nitrile, i.e., acrylonitrile, α-methyl acrylonitrile, crotononitrile or 2-methyl-2-butene-nitrile in a suitable inert organic solvent, e.g., anhydrous tetrahydrofuran, 1,4-dioxane, etc., in the presence of a strong base such as sodium alkoxide or a quaternary ammonium hydroxide, e.g., trimethylbenzylammonium hydroxide or triethylbenzylammonium hydroxide. The 3-(cyanomethyl)-substituted benzimidazolinyl piperidines of this invention may be prepared by treatment of the corresponding 3-(halomethyl)-substituted benzimidazolinyl piperidine with an alkali cyanide, e.g., potassium cyanide, thereby effecting replacement of the halo group with a cyano group.

Introduction of lower alkoxy-carbonyl-Z— in the 3-position of the benzimidazolinone moiety, wherein —Z— is as heretofore described, is accomplished by treatment of the corresponding 3-unsubstituted benzimidazolinone with a lower alkyl ester, preferably the methyl or ethyl ester, of the appropriate α,β-unsaturated carboxylic acid, i.e., a lower alkyl ester of acrylic acid, methacrylic acid, crotonic acid and 2-methyl-2-butenoic acid, in a suitable inert organic solvent, e.g., anhydrous tetrahydrofuran, 1,4-dioxane, etc., in the presence of a strong base such as sodium alkoxide or a quaternary ammonium hydroxide.

The following examples are intended to illustrate, but not to limit, the scope of the present invention.

*Example I*

To a stirred mixture of 5 parts 4-(2-oxo-1-benzimidazolinyl)-piperidine, 7.3 parts sodium carbonate, a few crystals of potassium iodide in 136 parts 4-methyl-2-pentanone is added dropwise a solution of 5.6 parts 1-bromo-2-phenoxy-ethane in 24 parts 4-methyl-2-pentanone. After the addition is complete, the whole is stirred and refluxed for 48 hours. After cooling, 100 parts water are added. The aqueous layer is separated and extracted once more with hexone. The combined organic layers are dried over MgSO₄ and evaporated. The oily residue is triturated in 40 parts diethylether, yielding crude 1-(2-phenoxy-ethyl)-4-(2-oxo-1-benzimidazolinyl)-piperidine. This crop is recrystallized from 32 parts toluene. After cooling overnight at room temperature, 1-(2-phenoxy-ethyl)-4-(2-oxo-1-benzimidazolinyl)-piperidine is obtained; M.P. 169–170.6° C.; pale-beige, granular powder.

*Example II*

A mixture of 4.8 parts 1-chloro-3-phenoxy-propane, 5 parts 4-(2-oxo-1-benzimidazolinyl)-piperidine, 7.3 parts sodium carbonate, a few crystals of potassium iodide in 160 parts 4-methyl-2-pentanone is stirred and refluxed for 72 hours. After cooling, 100 parts water are added. The aqueous layer is separated and extracted twice with 75 parts chloroform. The combined organic layers are dried over K₂CO₃ and evaporated. The solid residue is stirred in 40 parts hexone, filtered off and dried, yielding 1-(3-phenoxy-propyl)-4-(2-oxo-1-benzimidazolinyl)-piperidine; M.P. 169.4–170.8° C.; white amorphous powder.

*Example III*

To a stirred and refluxing mixture of 4.4 parts 4-(2-oxo-1-benzimidazolinyl)-piperidine, 3.2 parts sodium carbonate, a few crystals of potassium iodide in 160 parts 4-methyl-2-pentanone is added dropwise a solution of 4.1 parts 1-chloro-3-(phenyl-thio)-propane in 40 parts 4-methyl-2-pentanone. After the addition is complete, the whole is stirred and refluxed for 65 hours. After cooling, 50 parts water are added. The undissolved part is filtered off, triturated in water and filtered off again, yielding 1-[3-(phenyl-thio)-propyl]-4-(2-oxo-1-benzimidazolinyl)-piperidine; M.P. 164.5–165.5° C.; pale-grey, amorphous powder.

From the combined filtrates the organic phase is separated, dried over potassium carbonate, filtered and the filtrate is evaporated. The solid residue is triturated in acetone, filtered off again and dried, yielding less pure 1-[3-(phenyl-thio)-propyl]-4-(2-oxo-1-benzimidazolinyl)-piperidine; M.P. 162.5–164° C.

*Example IV*

To a stirred and refluxing solution of 4.4 parts 4-(2-oxo-1-benzimidazolinyl)-piperidine, 3.2 parts sodium carbonate, a few crystals of potassium iodide in 160 parts 4-methyl-2-pentanone is added dropwise a solution of 4.2 parts 1-chloro-3-(4-fluoro-phenoxy)-propane in 40 parts 4-methyl-2-pentanone. After the addition is complete, the whole is stirred and refluxed for 65 hours. After cooling, 50 parts water are added and the mixture is stirred for a few minutes. The organic layer is separated, dried over potassium carbonate and evaporated. The residue is recrystallized twice, first from 24 parts acetone and then from 60 parts acetone, yielding 1-[3-(4-fluoro-phenoxy)-propyl]-4-(2-oxo - 1 - benzimidazolinyl)-piperidine; M.P. 161–163° C.; white amorphous powder.

*Example V*

To a stirred and refluxing mixture of 60 parts 4-fluoro-benzenethiol, 93 parts 1-bromo-3-chloro-propane, 100 parts ethanol and 45 parts water is added dropwise a solution of 19 parts sodium hydroxide in 80 parts water. After the addition is complete, the whole is further stirred and refluxed for 8 hours. After cooling, the organic layer is separated and distilled in vacuo, yielding a first fraction of 1-chloro-3-(4-fluoro-phenyl-thio)-propane, with a boiling point of 136–140° C. at 13 mm. pressure and a second fraction of 1-chloro-3-(4-fluoro-phenyl-thio)-propane with a B.P. of 140–152° C. at 13 mm. pressure.

To a stirred mixture of 4.4 parts 4-(2-oxo-1-benzimidazolinyl)-piperidine, 3.2 parts sodium carbonate, a few crystals of potassium iodide in 160 parts 4-methyl-2-pentanone is added dropwise a solution of 4.8 parts 1-chloro-3-(4-fluoro-phenyl-thio)-propane in 40 parts 4-methyl-2-pentanone. After the addition is complete, the whole is stirred and refluxed for 65 hours. After cooling, 50 parts water are added. The organic layer is separated, dried over potassium carbonate, filtered and evaporated; the solid residue is recrystallized from 48 parts boiling acetone. After cooling to room temperature, a first fraction of crude 1-[3-(4-fluoro-phenyl-thio)-propyl]-4-(2-oxo-1-benzimidazolinyl)-piperidine is obtained. After further cooling the mother liquor to —20° C., a second fraction of crude 1-[3-(4-fluoro-phenyl-thio)-propyl]-4-(2-oxo-1-benzimidazolinyl)-piperidine is filtered off. The combined fractions are recrystallized once more from a mixture of 8 parts diisopropylether and 32 parts acetone. After cooling to room temperature, 1-[3-(4-fluoro-phenyl-thio)-proyl] - 4 - (2-oxo-1-benzimidazolinyl)-piperidine is obtained; M.P. 142–144° C.

*Example VI*

To a stirred and refluxing mixture of 84.5 parts 4-fluoro-thiophenol, 105.8 parts 1,4-dichloro-butane, and 120 parts ethanol is added dropwise a solution of 26.4 parts sodium hydroxide in 80 parts ethanol. After the addition is complete, the whole is further stirred and refluxed for 8 hours. Solidification occurs in the organic layer on standing overnight at room temperature which is extracted with chloroform. The organic layer is dried over magnesium sulfate, filtered and evaporated. The residue is distilled in vacuo yielding 1-chloro-4-(4-fluorothio-phenoxy)-butane; B.P. 153–154° C. at 11 mm. pressure.

To a mixture of 4.4 parts 4-(2-oxo-1-benzimidazolinyl)-piperidine, 3.2 parts sodium carbonate, a few crystals of potassium iodide in 200 parts 4-methyl-2-pentanone are added portionwise 4.9 parts 1-chloro-4-(4-fluoro-thio-phenoxy)-butane. After the addition is complete, the whole is stirred and refluxed for 65 hours. After cooling the reaction mixture is decomposed with 50 parts water. The organic layer is separated, dried over potassium carbonate, filtered and evaporated. The residue is taken up in a mixture of 120 parts acetone and 32 parts 2-propanol. The whole is filtered and the filtrate is heated to reflux. To this hot solution is added a warm solution of 2.6 parts oxalic acid dihydrate in acetone. After cooling to room temperature, the precipitated oxalate is filtered off and recrystallized from 120 parts methanol, yielding 1-[4-(4-fluoro-thio-phenoxy)-butyl]-4-(2-oxo-1-benzimidazolinyl)-piperidine oxalate; M.P. 166.5–171° C. (dec.).

*Example VII*

A mixture of 6 parts 4-chloro-1-(4-methoxyphenoxy)-butane, 5 parts 4-(2-oxo-1-benzimidazolinyl)-piperidine, 7.3 parts sodium carbonate, a few crystals of potassium iodide in 240 parts 4-methyl-2-pentanone is stirred and refluxed for 48 hours. After cooling, 100 parts water are added. The organic layer is separated, dried over $Na_2SO_4$ and evaporated. The residue is dissolved in 40 parts ethanol. Then there is added a solution of 2.8 parts $(COOH)_2 \cdot 2$ aq. in 400 parts ethanol. After cooling to room temperature, product is filtered off. This crop is recrystallized from 80 parts ethanol, to yield 1 - [4-(4-methoxy-phenoxy)-butyl]-4-(2-oxo-1-benzimidazolinyl)-piperidine oxalate hydrate; M.P. 166–178° C. (dec.); white amorphous powder. This compound contains one molecule of water of crystallization.

*Example VIII*

A mixture of 5.2 parts 4-chloro-1-phenoxybutane, 5 parts 4-(2-oxo-1-benzimidazolinyl)-piperidine, 7.3 parts sodium carbonate, a few crystals of potassium iodide in 240 parts 4-methyl-2-pentanone is stirred and refluxed for 72 hours. After cooling, 100 parts water are added. The organic layer is separated, dried over $Na_2SO_4$ and evaporated. The residue is dissolved in 60 parts ethanol. To this solution is added a solution of 2.8 parts $(COOH)_2 \cdot 2$ aq. in 60 parts ethanol. After cooling at room temperature, product is filtered off. This crop is triturated in a boiling mixture of 40 parts isopropanol and 40 parts acetone. The whole is filtered while hot, yielding product. This crop is recrystallized once more from 80 parts ethanol, to yield 1-(4-phenoxy-butyl)-4-(2-oxo-1-benzimidazolinyl)-piperidine oxalate hydrate; M.P. 208.4–209° C. (dec.); pale-beige, amorphous powder. This compound contains one molecule of water of crystallization.

*Example IX*

To a stirred mixture of 5 parts 4-(2-oxo-1-benzimidazolinyl)-piperidine, 7.3 parts sodium carbonate, a few crystals of potassium iodide in 136 parts 4-methyl-2-pentanone is added dropwise a solution of 4.8 parts 1-chloro-2-phenylthio-ethane in 24 parts 4-methyl-2-pentanone. After the addition is complete, the whole is stirred and refluxed for 66 hours. The reaction mixture is filtered while hot and the filtrate is evaporated. The oily residue is dissolved in 160 parts ether and the turbid solution is filtered several times until clear. The filtrate is evaporated. The oily residue is dissolved in 48 parts isopropanol. After cooling to 0° C., 1.8 parts crude 1-(2-phenylthio-ethyl) - 4 - (2-oxo-1-benzimidazolinyl)-piperidine is obtained. This crop is recrystallized from 16 parts isopropanol, yielding 1-(2-phenylthio-ethyl)-4-(2-oxo-1-benzimidazolinyl)-piperidine; M.P. 130–131° C.; white scales.

*Example X*

A mixture of 51.2 parts 4-fluoro-thiophenol and 180 parts sodium hydroxide solution 10% is stirred for 15 minutes at about 40° C. Then there are added dropwise 36.3 parts 2-chloro-ethanol (exothermic reaction: temperature rises to 75° C.). After the addition is complete, the whole is further stirred and refluxed for 2 h. 30. After cooling there are added 160 parts anhydrous ether. The aqueous layer is separated and extracted once more with ether. The combined etheric layers are washed twice with water, dried over sodium sulfate, filtered and evaporated. The oily residue is distilled in vacuo, yielding a first fraction of oily 2-(4-fluoro-thio-phenoxy)-ethanol; B.P. 111–120° C. at 1 mm. pressure and a second fraction of oily 2-(4-fluoro-thio-phenoxy-ethanol, B.P. 120–123° C. at 2 mm. pressure.

To a stirred and refluxing mixture of 115 parts 2-(4-fluoro-thio-phenoxy)-ethanol in 390 parts chloroform are added dropwise 90 parts thionylchloride. After the addition is complete, the whole is further stirred and refluxed for another 4 hours. The reaction mixture is then stirred overnight at room temperature. After evaporation the residue is distilled in vacuo, yielding oily 1-chloro-2-(4-fluoro-thio-phenoxy)-ethane; B.P. 122–123° C. at 14 mm. pressure; $n_D^{20}$: 1.5560; $d_{20}^{20}$: 1.2613.

To a stirred mixture of 4.4 parts 4-(2-oxo-1-benzimidazolinyl)-piperidine, 3.2 parts sodium carbonate, a few crystals of potassium iodide in 200 parts 4-methyl 2-pentanone are added 4.2 parts 1-chloro-2-(4-fluoro-thiophenoxy)-ethane. The whole is stirred and refluxed for 65 hours. After cooling, the reaction mixture is decomposed with 70 parts water. The organic layer is separated, dried over potassium carbonate, filtered and evaporated. The residue is treated with a mixture of 120 parts acetone and 40 parts 2-propanol. The whole is filtered and the filtrate is boiled for a few minutes. To this hot solution is added a solution of 2.6 parts oxalic acid dihydrate in acetone. The turbid solution is boiled for another few minutes and after cooling to room temperature, 1-[2-(4-fluoro-thio-phenoxy)-ethyl]-4-(2-oxo-1-benzimidazolinyl)-piperidine oxalate is filtered off; M.P. 200–203° C. (dec.).

*Example XI*

To a stirred and refluxing mixture of 199 parts 4-methyl-thiophenol, 314 parts 1-bromo-3-chloro-propane, 360 parts benzene and 450 parts water is added dropwise a solution of 64.7 parts sodium hydroxide in 225 parts water. After the addition is complete, the whole is stirred and refluxed for 8 hours. The organic layer is separated, dried over magnesium sulfate, filtered and evaporated. The oily residue is distilled in vacuo, yielding 1-chloro-3-(4-methyl-thio-phenoxy)-propane; B.P. 152–156° C. at 10 mm. pressure.

To a stirred mixture of 4.4 parts 4-(2-oxo-1-benzimidazolinyl)-piperidine, 3.2 parts sodium carbonate, a few crystals of potassium iodide in 200 parts 4-methyl-2-pentanone are added portionwise 4.4 parts 1-chloro-3-(4-methyl-thio-phenoxy)-propane. After the addition is complete, the whole is stirred and refluxed for 65 hours. After cooling, 70 parts water are added. The organic layer is separated, dried over potassium carbonate, filtered and evaporated. The solid residue is triturated in acetone, filtered off again and dried. After recrystallization from 40 parts acetone, 1-[3-(4-methyl-thio-phenoxy)-propyl]-4-(2-oxo-1-benzimidazolinyl)-piperidine is obtained; M.P. 165.5–168° C.

*Example XII*

A mixture of 4.9 parts 1-chloro-4-(4-chlorophenoxy)-butane, 4.4 parts 4-(2-oxo-1-benzimidazolinyl)-piperidine, 3.2 parts sodium carbonate, a few crystals of potassium iodide in 200 parts 4-methyl-2-pentanone is stirred and refluxed for 60 hours. After cooling, the reaction mixture is decomposed with 50 parts water. The organic layer is separated, dried over potassium carbonate and evaporated. The residue is dissolved in 32 parts ethanol. To this hot solution is added a warm solution of 2.5 parts oxalic acid dihydrate in 24 parts ethanol. After cooling overnight to −20° C., the formed precipitate is filtered off and dried, yielding crude 1-[4-(4-chloro-phenoxy)-butyl] - 4 - (2-oxo-1-benzimidazolinyl)-piperidine oxalate. On further cooling of the mother liquor at −20° C., a second fraction of crude 1-[4-(4-chloro-phenoxy)-butyl]-4-(2-oxo - 1 - benzimidazolinyl)-piperidine oxalate is obtained. The combined fractions are boiled in a mixture of 24 parts acetone and 40 parts 2-propanol. The undissolved part is filtered off, yielding 1-[4-(4-chloro-phenoxy)-butyl]-4-(2-oxo - 1 - benzimidazolinyl) - piperidine oxalate; M.P. 194–197° C.; white, amorphous powder.

*Example XIII*

A mixture of 4.4 parts 1-chloro-4-(4-methylphenoxy)-butane, 4.4 parts 4-(2-oxo-1-benzimidazolinyl)-piperidine, 3.2 parts sodium carbonate, a few crystals of potassium iodide in 200 parts 4-methyl-2-pentanone is stirred and refluxed for 60 hours. After cooling, 50 parts water are added. The organic layer is separated, dried over potassium carbonate and evaporated. The oily residue is evaporated in acetone. The solid residue is triturated in 8 parts acetone and dried, yielding 2.9 parts crude 1-[4-(4-methyl-phenoxy)-butyl] - 4 - (2-oxo-1-benzimidazolinyl)-piperidine. This crop is recrystallized from 40 parts boiling acetone. The whole is filtered while hot and the filtrate is cooled overnight at 0° C. and further for 4 hours at −20° C., yielding 1-[4-(4-methylphenoxy)-butyl]-4-(2-oxo-1-benzimidazolinyl)-piperidine; M.P. 138–139° C.; pale-beige, amorphous powder.

*Example XIV*

A mixture of 9 parts 1-bromo-5-phenoxy-pentane, 6.5 parts 4-(2-oxo-1-benzimidazolinyl)-piperidine, 4.8 parts sodium carbonate, a few crystals of potassium iodide in 200 parts 4-methyl-2-pentanone is stirred and refluxed for 60 hours. After cooling 50 parts water are added. The organic layer is separated, dried over potassium carbonate, and evaporated. The solid residue is triturated in 24 parts acetone, yielding 4-(2-oxo-1-benzimidazolinyl)-1-(5-phenoxy-pentyl)-piperidine. This crop is dissolved in 80 parts boiling acetone. After keeping for 40 hours at room temperature, 2.6 parts of 4-(2-oxo-1-benzimidazolinyl)-1-(5-phenoxy-pentyl)-piperidine are obtained. This fraction is dissolved in a mixture of 240 parts diisopropylether and 24 parts acetone. The undissolved part is filtered off. The filtrate is dried over potassium carbonate and gaseous hydrogen chloride is introduced into the solution, whereupon a sticky hydrochloride is precipitated. The whole is evaporated. The residue is triturated in 40 parts acetone, yielding 1-(5-phenoxy-pentyl)-4-(2-oxo-1-benzimidazolinyl)-piperidine hydrochloride; M.P. 177–178.6° C.; pale-brown, amorphous powder.

*Example XV*

A mixture of 7 parts 1-chloro-3-(4-methoxyphenoxy)-propane, 6.5 parts 4-(2-oxo-1-benzimidazolinyl)-piperidine, 4.8 parts sodium carbonate, a few crystals of potassium iodide in 240 parts 4-methyl-2-pentanone is stirred and refluxed for 48 hours. After cooling, 150 parts water are added. The organic layer is separated, dried over $K_2CO_3$ and concentrated. After keeping the residue at room temperature, 1-[3-(4-methoxyphenyl)-propyl]-4-(2-oxo-1-benzimidazolinyl)-piperidine is filtered off; M.P. 164–166° C.; pale-rose, amorphous powder.

*Example XVI*

To a mixture of 80 parts thymol and 203 parts 1,4-dichloro-butane in 160 parts ethanol is added dropwise a sodiumethoxide solution, prepared in the usual manner, starting from 13.8 parts sodium and 160 parts ethanol. After the addition is complete, the whole is stirred and refluxed for 5 hours. After cooling the reaction mixture, the formed sodium chloride is filtered off and the filtrate is evaporated. The residue is washed with sodium hydroxide solution 2 N and extracted with ether. The etheric layer is dried over sodium sulfate and evaporated. The oily residue is distilled in vacuo, yielding a first fraction of 1-chloro-4-(2-isopropyl-5 - methyl - phenoxy) - butane; B.P. 133° C. at 1 mm. pressure and a second fraction of 1-chloro-4-(2-isopropyl-5-methyl-phenoxy) - butane; B.P. 152–153° C. at 2.5 mm. pressure.

A mixture of 6.6 parts 1-chloro-4-(2-isopropyl-5-methyl-phenoxy)-butane, 5.1 parts 4-(2-oxo-1-benzimidazolinyl)-piperidine hydrochloride, 6.3 parts sodium carbonate, a few crystals of potassium iodide in 200 parts 4-methyl-2-pentanone is stirred and refluxed for 48 hours. After cooling the reaction mixture, there are added 100 parts water. The organic layer is separated, dried over potassium carbonate and evaporated. The oily residue is dissolved in 120 parts 2-propanol. To this hot solution is added a warm solution of 2.3 parts oxalic acid dihydrate in 40 parts 2-propanol. After cooling to room temperature, the precipitated oxalate is filtered off and dried, to yield 1 - [4 - (2 - isopropyl - 5-methyl)-phenoxy-butyl]-4-(2-oxo-1 - benzimidazolinyl) - piperidine oxalate; M.P. 206–207° C.

*Example XVII*

A mixture of 3.7 parts 1 - [3 - (4 - fluoro-phenoxy)-propyl] - 4 - (2-oxo-1-benzimidazolinyl)-piperidine, 7.5 parts propionic acid anhydride, 80 parts anhydrous benzene is stirred and refluxed for 10 hours. After cooling the reaction mixture is washed twice with 50 parts water. The aqueous solution is alkalized with ammonium hydroxide solution, washed with water and the organic layer is separated. The latter is dried over potassium carbonate, filtered and evaporated. The oily residue is dissolved in 4-methyl-2-pentanone and evaporated again. The solid residue is triturated in diisopropylether. After cooling for one hour at −20° C., 1-[3-(4-fluoro-phenoxy)-propyl]-4-(2-oxo-3-propionyl-1-benzimidazolinyl)-piperdine is filtered off, M.P. 117–117.5° C.

*Example XVIII*

A mixture of 11.1 parts 1 - [3 - (4 - fluoro-phenoxy)-propyl] - 4 - (2-oxo-1-benzimidazolinyl)-piperidine, 40 parts formaldehyde and 200 parts 2-propanol is stirred and refluxed for 15 hours. The reaction mixture is filtered hot and after keeping the filtrate for 2 days at room temperature, the formed precipitate is filtered off, washed with 2-propanol and dried in vacuo, to yield 1-[3-(4-fluoro - phenoxy)-propyl]-4-[3-(hydroxy-methyl)-2-oxo-1-benzimidazolinyl]-piperidine; M.P. 120–122° C.

*Example XIX*

To a mixture of 80 parts thymol, 251 parts 1-bromo-3-chloro-propane in 80 parts ethanol is added dropwise a sodiumethoxide solution, prepared in the usual manner starting from 13.8 parts sodium in 240 parts ethanol. After the addition is complete, the whole is stirred and refluxed for 5 hours. After cooling the precipitated sodium bromide is filtered off and the filtrate is evaporated. The oily residue is dissolved in ether. The etheric solution is washed with sodium hydroxide solution 2 N, dried over sodium sulfate, filtered and evaporated. The oily residue is distilled in vacuo, to yield crude product. This fraction is washed once more with sodium hydroxide solution 2 N and redistilled in vacuo, to yield 1-chloro-3-(2-isopropyl-5-methyl-phenoxy)-propane; B.P. 119–120° C. at 3 mm. pressure.

A mixture of 3.9 parts 1 - chloro - 3 - (2-isopropyl-5-methyl-phenoxy)-propane, 5.1 parts 4-(2-oxo-1-benzimidazolinyl)-piperidine hydrochloride, 5.3 parts sodium carbonate, a few crystals of potassium iodide in 200 parts 4-methyl-2-pentanone is stirred and refluxed for 70 hours. After cooling there are added 100 parts water. The organic layer is separated, dried over potassium carbonate, filtered and evaporated. The oily residue is dissolved in 56 parts boiling 2-propanol. To this hot solution is added a solution of 2.6 parts oxalic acid dihydrate in 16 parts 2-propanol. After cooling to room temperature, the solid oxalate is filtered off, washed on the filter with 2-propanol and dried in vacuo, to yield 1-[3-(2-isopropyl-5 - methyl - phenoxy) - propyl]-4-(2-oxo-1-benzimidazolinyl)-piperidine oxalate; M.P. 205–206° C. (dec.).

*Example XX*

A mixture of 5.6 parts 1 - bromo - 2 - (2-isopropyl-5-methyl-phenoxy)-ethane, 5.1 parts 4-(2-oxo-1-benzimidazolinyl)-piperidine hydrochloride, 5.3 parts sodium carbonate, a few crystals of potassium iodide in 200 parts 4-methyl-2-pentanone is stirred and refluxed for 72 hours. After cooling there are added 100 parts water. The organic layer is separated, dried over potassium carbonate, filtered and evaporated. The oily residue is dissolved in 80 parts boiling 2-propanol. To this hot solution is added a warm solution of 2.6 parts oxalic acid dihydrate in 16 parts 2-propanol. After cooling overnight at room temperature, the precipitated solid oxalate is filtered off and dried in vacuo, to yield 1-[2-(2-isopropyl-5-methyl-phenoxy) - ethyl] - 4 - (2-oxo-1-benzimidazolinyl)-piperidine oxalate; M.P. 211–212° C. (dec.).

*Example XXI*

31.5 parts thionylchloride are added dropwise to 7.5 parts 1 - [3 - (4-fluoro-phenoxy)-propyl]-4-[3-(hydroxymethyl) - 2-oxo-1-benzimidazolinyl]-piperidine at a temperature below 16° C. (cooling in an ice-bath). After the addition is complete, the whole is stirred for 6 hours at this temperature. The cooling-bath is removed and there are added 80 parts diisopropylether. After keeping this mixture for a few days at room temperature a solid is precipitated. It is filtered off and triturated in the cold in 80 parts acetone. The solid is filtered off again and dried in vacuo, yielding 1-[3-(4-fluoro-phenoxy)-propyl] - 4 - [3 - (chloro - methyl) - 2 - oxo - benzimidazolinyl] - piperidine hydrochloride; M.P. 236–237° C. (dec.).

*Example XXII*

A sodium methoxide solution, prepared in the usual manner starting from 2.76 parts sodium and 40 parts methanol is added dropwise to a solution of 7.3 parts 1-[3 - (4 - fluoro-phenoxy) - propyl]-4-[3-(chloro-methyl)-2-oxo-1-benzimidazolinyl]-piperidine hydrochloride in 92 parts methanol. After the addition is complete, the whole is stirred and refluxed for 6 hours. The remaining precipitate is filtered off and discarded and the filtrate is evaporated. The residue is washed successively with chloroform and water. The chloroform layer is dried over sodium sulfate, filtered and evaporated. The solid residue is recrystallized from 160 parts boiling methanol. This solution is filtered and after keeping the filtrate at room temperature, the precipitated solid is filtered off and dried in vacuo, yielding 1-[3-(4-fluoro-phenoxy)-propyl]-4 - [3 - (methoxy - methyl) - 2-oxo-1-benzimidazolinyl]-piperidine; M.P. 133–135.5° C.

*Example XXIII*

A mixture of 3.85 parts 1 - [3 - (4 - fluoro-phenylthio)-propyl] - 4 - (2-oxo-1-benzimidazolinyl)-piperidine, 0.75 part sodamide and 120 parts toluene is stirred and refluxed for 6 hours. After cooling there are added portionwise 4.3 parts N,N,N-trimethylaniliniumbromide and after the addition is complete, the whole is stirred and refluxed for another 40 hours. After cooling the reaction mixture, there are added 20 parts water. The organic layer is separated, washed with water, extracted with hydrochloric acid 50%, alkalized with sodium hydroxide solution and extracted with ether. The organic layer is dried over potassium carbonate, filtered and gaseous hydrogen chloride is introduced into the filtrate; an oily hydrochloride is obtained. The ether is decanted and the oily residue is triturated in 12 parts boiling acetone. After keeping for 2 days at room temperature, the solid is filtered off and dried yielding 1-[3-(4-fluoro-thio-phenoxy) - propyl] - 4-(3-methyl-2-oxo-1-benzimidazolinyl)-piperidine hydrochloride; M.P. 205–207° C. (hygroscopic).

*Example XXIV*

To a heated mixture (±45° C.) of 3.85 parts 1-[3-(4-fluoro - phenyl - thio)-propyl]-4-(2-oxo-1-benzimidazolinyl) - piperidine, 0.4 parts trimethylbenzylammoniumhydroxide in 20 parts tetrahydrofurane is added dropwise a solution of 2.06 parts acrylonitrile in 20 parts tetrahydrofurane. After the addition is complete, the whole is stirred for 3 h. 30 at 45° C. The reaction mixture is evaporated. The oily residue is dissolved in 80 parts boiling 2-propanol. After filtration the filtrate is cooled for 2 days at room temperature, whereupon a solid is obtained. It is filtered off and recrystallized from 40 parts 2-propanol. After keeping overnight at room temperature, 1 - [3-(4-fluoro-thio-phenoxy)-propyl]-4-[3-(2-cyano-ethyl)-2-oxo-1-benzimidazolinyl]-piperidine is obtained; M.P. 80.2–82.2° C. (dec.).

*Example XXV*

A mixture of 3.7 parts 1-[3-(4-fluorophenoxy)-propyl]-4-(2-oxo-1-benzimidazolinyl)-piperidine, 0.4 part trimethylbenzylammoniumhydroxide and 50 parts tetrahydrofurane is heated to 45° C. Then there are added portionwise 2.06 parts acrylonitrile. After the addition is complete, the whole is heated for 3 h. 30 at 45° C. The reaction mixture is evaporated. The oily residue is dissolved in 80 parts 2-propanol while boiling. After keeping for 4 days at room temperature, the formed solid is filtered off, washed with 2-propanol and dried, yielding crude 1-[3-(4-fluoro-phenoxy)-propyl]-4-[3-(2-cyano-ethyl) - 2-oxo-1-benzimidazolinyl]-piperidine. After recrystallization of this crop from 48 parts boiling 2-propanol and cooling to room temperature, there are obtained two fractions, respectively impure 1-[3-(4-fluorophenoxy)-propyl] - 4 - [3 - (2-cyano-ethyl)-2-oxo-1-benzimidazolinyl]- piperidine; M.P. 133–134° C. (dec.); and pure 1-[3-(4-fluoro - phenoxy)-propyl]-4-[2-cyano-ethyl)-2-oxo-1-benzimidazolinyl]-piperidine; M.P. 134.5–136.5° C.

*Example XXVI*

To a warmed (50° C.) mixture of 3.85 parts 1-[3-(4-fluoro - phenyl-thio)-propyl]-4-(2-oxo-1-benzimidazolinyl) - piperidine, 0.6 parts trimethylbenzylammoniumhydroxide and 80 parts tetrahydrofurane, are added portionwise 8 parts ethyl acrylate. After the addition is complete, the whole is stirred for 7 hours at a temperature of about 50–55° C. After cooling to room temperature, the reaction mixture is filtered and the filtrate is evaporated. The residue is dissolved in a mixture of ether and acetone. This solution is filtered and then gaseous hydrogen chloride is introduced into the filtrate: no precipitate is formed. The whole is evaporated. The oily residue is boiled in 24 parts acetone and filtered. After keeping the filtrate for two days at room temperature, the formed solid is filtered off, triturated in acetone, filtered off again and dried in vacuo, yielding 1-[3-(4-fluoro-thiophenoxy) - propyl] - 4-{3-[2-(ethoxy-carbonyl)-ethyl]-2-oxo-1-benzimidazolinyl}-piperidine hydrochloride; M.P. 123–213° C. (dec.).

*Example XXVII*

A mixture of 4.8 parts 1-bromo-2-(4-fluoro-phenoxy)-ethane, 5.1 parts 4-(2-oxo-1-benzimidazolinyl)-piperidine hydrochloride, 5.3 parts sodium carbonate, a few crystals of potassium iodide and 200 parts 4-methyl-2-pentanone is stirred and refluxed for 70 hours. After cooling, there are added 70 parts water. The organic layer is separated, dried over potassium carbonate, filtered and evaporated. The oily residue is dissolved in a mixture of 120 parts acetone and 40 parts methanol. The solution is filtered and boiled. Then a solution of 2.6 parts oxalic acid dihydrate in 40 parts methanol is added and the whole is boiled and stirred for awhile. After cooling, the precipitated oxalate is filtered off and dried to yield crude 1-[2-(4-fluoro-phenoxy)-ethyl]-4-(2-oxo-1-benzimidazolinyl)-piperidine oxalate. This crude product is recrystallized from a mixture of 40 parts 2-propanol and 80 parts methanol to yield 1-[2-(4-fluorophenoxy)-ethyl]-4-(2-oxo-1-benzimidazolinyl)-piperidine oxalate; M.P. 129.5–155.5° C. (dec.).

*Example XXVIII*

Interaction of 1-[3-(4-fluorophenoxy)-propyl]-4-[3-(chloromethyl)-2-oxo-1-benzimidazolinyl]-piperidine with potassium cyanide in aqueous ethanol yields 1-[3-(4-fluorophenoxy)-propyl]-4-[3-(cyanomethyl)-2-oxo-1-benzimidazolinyl]-piperidine.

What is claimed is:

1. A chemical compound selected from the group consisting of

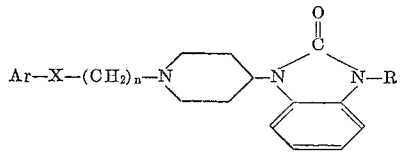

and the therapeutically active non-toxic acid addition salts thereof wherein Ar is a member selected from the group consisting of phenyl, halophenyl, lower alkylphenyl, di-lower alkylphenyl and lower alkoxyphenyl; R is a member selected from the group consisting of hydrogen, lower alkyl, lower alkyl-carbonyl, hydroxymethyl, halomethyl, lower alkoxymethyl, cyanomethyl, cyano-Z— and lower alkoxy-carbonyl-Z—, said —Z— being a $$-CH(R_2)CH(R_2)-$$

radical wherein $R_2$ is a member selected from the group consisting of hydrogen and methyl; X is a member selected from the group consisting of oxygen and sulfur; and $n$ is an integer from 2 to 5.

2. 1-[3-(4-fluoro-phenoxy)-propyl]-4-(2-oxo-1-benzimidazolinyl)-piperidine.

3. 1-[3-(4-fluoro-phenyl-thio)-propyl]-4-(2-oxo-1-benzimidazolinyl)-piperidine.

4. 1-[3-(4-fluoro-phenoxy)-propyl]-4-[3-hydroxymethyl)-2-oxo-1-benzimidazolinyl]-piperidine.

5. 1-[3-(phenyl-thio)-propyl]-4-(2-oxo-1-benzimidazolinyl)-piperidine.

6. 1-[3-(4-fluoro-phenoxy)-propyl]-4-[3-(methoxymethyl)-2-oxo-1-benzimidazolinyl]-piperidine.

References Cited by the Examiner

UNITED STATES PATENTS 3,141,823   7/1964   Janssen et al. _____ 167—65

WALTER A. MODANCE, *Primary Examiner.*

UNITED STATES PATENT OFFICE
CERTIFICATE OF CORRECTION

Patent No. 3,225,052                                          December 21, 1965

Paul Adriaan Jan Janssen

It is hereby certified that error appears in the above numbered patent requiring correction and that the said Letters Patent should read as corrected below.

In the grant, line 1, and in the heading to the printed specification, line 4, name of inventor, for "Raul Adriaan Jan Janssen", each occurrence, read -- Paul Adriaan Jan Janssen --; column 6, line 17, for "-phenoxy-ethanol" read -- -phenoxy)-ethanol --; column 9, line 42, for "-oxo-" read -- -oxo-1- --.

Signed and sealed this 13th day of December 1966.

(SEAL)
Attest:

ERNEST W. SWIDER                                        EDWARD J. BRENNER
Attesting Officer                                              Commissioner of Patents